Sept 17, 1957
L. G. SIMJIAN
2,806,246
FOOD TENDERIZER
Filed March 2, 1956
2 Sheets-Sheet 1
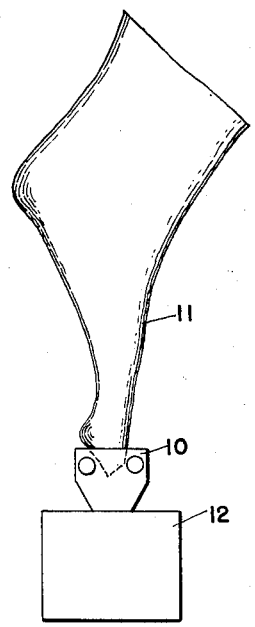
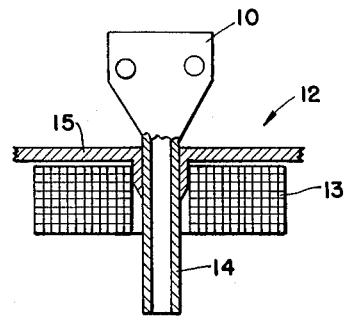
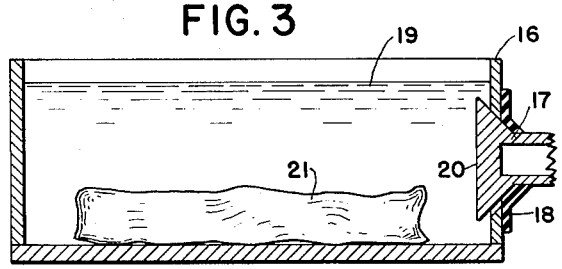
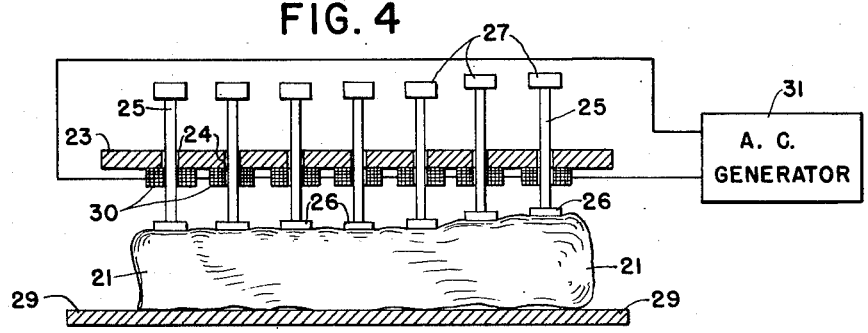
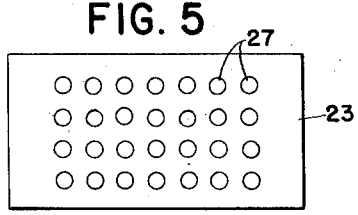
LUTHER G. SIMJIAN
INVENTOR
BY Ralph E. Bitner
ATTORNEY Sept. 17, 1957  L. G. SIMJIAN  2,806,246
FOOD TENDERIZER
Filed March 2, 1956  2 Sheets-Sheet 2
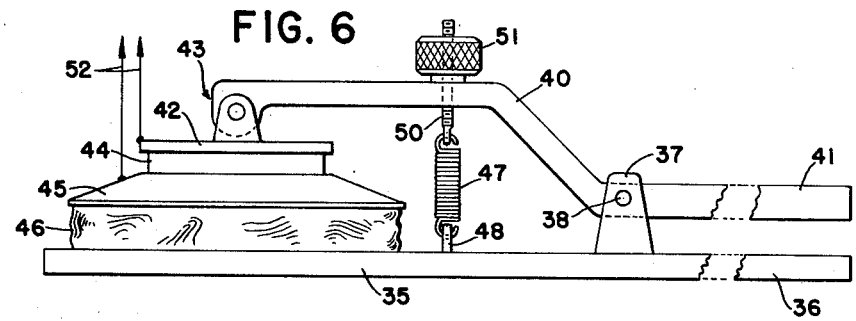
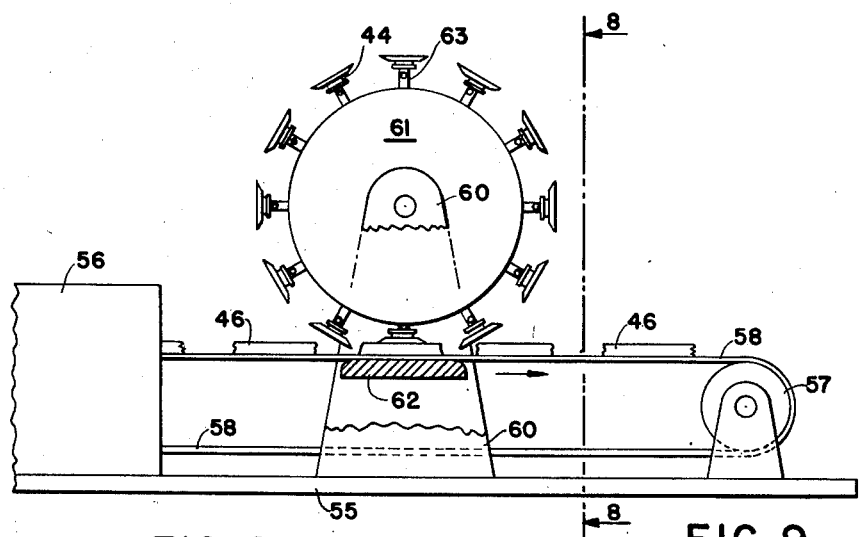
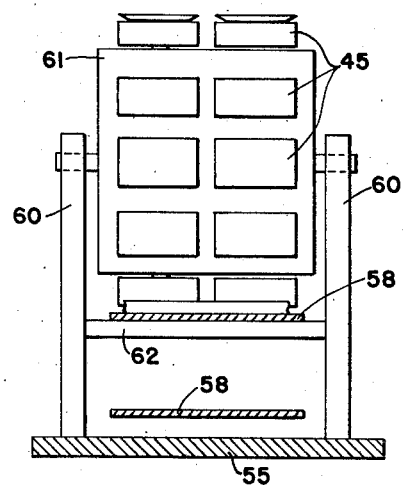
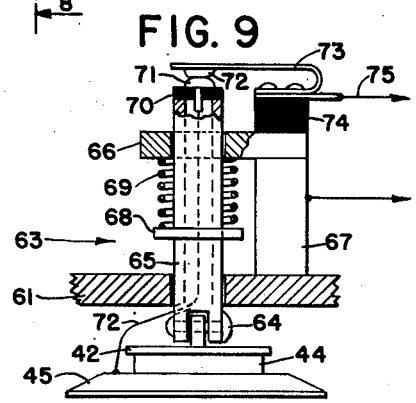
LUTHER G. SIMJIAN
INVENTOR
BY Ralph E. Bitner
ATTORNEY

United States Patent Office 2,806,246
Patented Sept. 17, 1957

2,806,246

FOOD TENDERIZER

Luther G. Simjian, Greenwich, Conn., assignor to The Reflectone Corporation, Stamford, Conn., a corporation of Connecticut Application March 2, 1956, Serial No. 569,124

11 Claims. (Cl. 17—25)

This is a continuation-in-part of application, Serial No. 361,051, filed June 11, 1953, which has been abandoned.

This invention relates to a method and means for tenderizing food, making it more palatable and digestible. It has particular reference to the application of high frequency mechanical vibrations to food products which have been frozen to a rigid state.

It is well-known that the toughness found in many cuts of meat is due to hard fibers which are present in the meat and which are not easily acted upon by the application of heat. It is also well-known that certain types of fruit such as grapefruit and oranges are somewhat indigestible because of numerous tough fibers which are always present in certain varieties of this fruit. Meat may be tenderized by excessive mechanical manipulation by pounding with a hammer or other blunt objects. This method is not entirely successful and has the disadvantage of distorting the meat and squeezing out many of the meat juices. The present invention employs mechanical movement to break the tough fibers in the food but this is done when the food is in a rigid frozen state so that the shape of the article is not changed and none of the juices are lost. The mechanical vibration necessary is obtained by a transducer which is actuated by high frequency waves which may vary from 1,000 cycles per second to 1,000,000 cycles per second.

Throughout the specification and claims the term "coupling" is defined as any mechanical or fluid transmitting means which transfers the vibrating energy from the transducer to the frozen object.

One of the objects of this invention is to provide an improved food tenderizer which avoids one or more of the disadvantages and limitations of prior art arrangements.

Another object of the invention is to provide a structure for tenderizing food which is convenient and can be operated by inexperienced personnel.

Another object of the invention is to provide a food tenderizer which will consume a comparatively short time for the tenderizing operation.

Another object of the invention is to tenderize food while still frozen, thereby eliminating the possibility of food spoilage.

One feature of the invention includes a clamping device which may be clamped on to the end of a frozen portion of food. The clamping device is coupled to a transducer which applies powerful high frequency vibrations to the clamp and the food.

Another feature of the invention includes the method of submerging frozen food articles in a tank of liquid and then applying high frequency mechanical vibrations to the liquid.

A third feature of the invention comprises a multiple applicator which can be applied to irregular articles of food, such as frozen meat, and then applying magnetostrictive energy to each of the applicators by a source of high frequency energy.

A fourth feature of the invention comprises a plurality of transducers mounted on the surface of a cylindrical drum and adapted to make contact with a continuous supply of frozen articles of food on an endless belt.

For a better understanding of the present invention together with other and further objects thereof, reference is made to the following description taken in connection with the accompanying drawings.

Fig. 1 is a side view of a portion of frozen meat held in a clamp.

Fig. 2 is a detailed cross sectional view of the clamp arrangement and indicates one means for transforming high frequency electrical energy into vibrations which can be applied to large portions of meat.

Fig. 3 is a sectional view of a tank for frozen food objects containing a transducer at one side thereof.

Fig. 4 is a sectional view of a multiple applicator for applying high frequency vibrations to a number of areas on a frozen food object.

Fig. 5 is a plan view of the multiple applicator shown in Fig. 4 and shows the disposition of the applicators.

Fig. 6 is a side view of a food tenderizer which is for small objects and includes resilient means for maintaining the object under pressure.

Figure 7 is a side view of a continuous tenderizing device showing a plurality of transducers on a drum and the articles of food moved by a continuous belt.

Fig. 8 is a cross sectional view of the device shown in Fig. 7 and is taken along line 8—8 of that figure.

Fig. 9 is a detailed view of one of the transducer mountings shown in Figs. 7 and 8 with some parts in section.

Referring now to Figs. 1 and 2, a clamp 10, which consists of two jaws, is arranged to securely hold a large piece of meat 11 by clamping to the lower portion which is largely bone structure. The meat 11 must be frozen so that it is rigid throughout its entire volume. The clamp 10 is secured to a magneto-strictive unit 12 which comprises a coil 13, to which is applied the high frequency energy, and a hollow shaft 14 made of nickel which extends through the center of the coil and is secured to a flat supporting piece 15. It is convenient and highly efficient to support the clamp 10 and its shaft 14 at a node which in this case is approximately the central part of the vibrating assembly. In this manner a strong support may be employed without cutting down the efficiency of the vibrating element.

The device shown in Fig. 3 comprises a tank 16, open at the top, and containing an opening at one of its ends into which a transducer 17 is positioned. A rubber gasket 18 is secured to the outside of the tank and also to some part of the transducer so that liquid within the tank will not run out. The transducer 17 is similar to the one shown in Fig. 2 except it is formed with a flat end portion 20 instead of a clamp. The flat end portion 20 should have an area of at least 75 percent of the area of the side wall.

The tank is used as follows: An article of food 21 which is frozen to a rigid condition is placed in the tank and water or other suitable liquid 19 is poured over it so as to completely cover the article of food and also to be above the topmost portion of the transducer face 20. Then high frequency energy is applied to the transducer 17 to cause it to vibrate and produce intense waves of compression and rarefaction within the liquid 19. These vibrations are transmitted to the entire upper surface of the article of food 21, the liquid 19 acting as the coupling means between the transducer and the object 21. The resultant mechanical motion within food object causes splitting and breaking of the hard fibers, thereby tenderizing it.

Figs. 4 and 5 indicate the manner in which a number of vibrating elements can be applied to an irregular object. A supporting plate 23 contains a number of holes 24 through which extend a plurality of nickel rods 25.

The rods are supplied with small flat disks 26 for application to a portion of a food object 21 which is positioned below plate 23 and resting on plate 29. In order to insure a good and sufficient contact between the disks 26 and the article of food 21 each nickel rod is supplied with a weight 27 mounted on its upper end. These weights, in addition to causing good contact with the food, act as a supporting node for the nickel rod. This means that the high inertia of the weights force the nickel rods to expand and contract under magnetostrictive actuation so that only the ends with the disks vibrate. The coupling means in this device includes the bottom portion of each rod 25 and the disks 26.

Magnetostrictive actuation is supplied by a plurality of coils 30 which are secured to plate 23 and positioned adjacent to the holes 24 in that component. Each coil 30 surrounds a nickel rod 25 passing through a hole in the winding and when high frequency power is applied to these coils from any suitable generator 31, the rods will vibrate in a longitudinal direction. The coils 30 may be connected in series or parallel arrangement depending upon the impedance and power characteristics of source 31.

The food tenderizer shown in Fig. 6 is for a small article of food such as a pork chop or a small steak. It comprises a base plate 35 having an extension 36 which may be used as a handle. A support 37 carries a short shaft 38 which pivots a lever 40, also including an extension 41 which may be used as a handle. The end of lever 40 is coupled to an electrode plate 42 by means of a pivot arrangement 43 so that plate 42 may be rocked through a small angle. Secured to electrode plate 42 is a piezoelectric crystal 44 which may be quartz cut on its X axis, Rochelle salt or barium titanate. The lower side of the crystal is cemented to a second electrode plate 45 which is designed to clamp an article of frozen food 46 between its lower surface and the base plate 35.

In order to resiliently clamp the article of food at a predetermined pressure, a spring 47 is employed, joined to a lug 48 on the base plate and adjustably fastened to lever 40 by a machine screw 50 and a knurled nut 51. Alternating current power is supplied to the crystal 44 by means of conductors 52 connected to electrode plates 42 and 45.

When the device is operated, handles 41 and 36 are squeezed together, separating plates 35 and 45. The article of food is placed on plate 35 and the plates are allowed to clamp the article under pressure. High frequency power is then applied by conductors 52 until the desired degree of tenderness is obtained and then the power is turned off and the article is released.

The tenderizing device shown in Figs. 7, 8, and 9, is designed to operate on a large number of frozen articles. A base 55 supports a freezer 56 (which may be a cold storage compartment), a pulley 57 for an endless belt 58, and end supports 60 for a revolving drum 61. Between the two supports 60 (see Fig. 8) a smooth plate 62 is secured, this plate furnishing a rigid support for the belt 58 when passing between transducers on the drum and the plate.

The drum 61 is supplied with a plurality of resilient transducer mounts 63 which hold piezoelectric crystals 44 between electrode plates 42 and 45 (see Fig. 9). Mounts 63 include a loose mechanical coupling 64 between plate 42 and a hollow shaft 65 which passes through a hole in the drum 61 and extends radially inside the drum, being slidably supported by a bracket 66 secured to a pillar 67. A collar 68 is secured to shaft 65 and a strong helical expansion spring 69 is positioned between the collar 68 and the bracket 66 urging the support and the transducer away from the exterior surface of the drum. When the electrode plate 45 is free, collar 68 limits against the inside surface of drum plate 61 and remains in that position until contact is made with an article of food on endless belt 58.

An insulator 70 is secured to the internal end of shaft 65 and a contact 71 is mounted on its end surface. This contact is connected to electrode plate 45 by a conductor 72 which lies within the hollow portion of shaft 65. A second contact 72 is secured to a flat spring 73 which is secured to an insulator block 74 mounted on bracket 66.

When electrode plate 45 is not in contact with an article of food 46 on endless belt 58, contacts 71, 72 are separated and high frequency current which is supplied over conductor 75 cannot energize the crystal 44. When plate 45 makes contact with an object on the belt it is forced upwardly against spring 69 and contacts 70, 71, are closed, energizing the crystal and transmitting mechanical vibrations of high frequency to the object.

The above described devices are operated by magnetostriction and by piezoelectric crystals. It will be obvious that many other types of transducers can be used, such as; electromagnetic devices, air pressure resonators, or capacitor motors, as long as sufficient power can be transmitted at the frequency of the applied electric wave.

While there have been described and illustrated specific embodiments of the present invention, it will be obvious that various modifications can be made without departing from the scope of the appended claims.

I claim:

1. A tenderizer for a normally deformable article of food which has been transformed from its deformable state to a substantially rigid state comprising, an electromechanical means for transforming electrical energy into mechanical vibrations and coupling means associated with said electromechanical means for transferring said vibrations from said electromechanical means to said article which is rendered substantially rigid.

2. A tenderizer for a normally deformable article of food which has been transformed from its deformable state to a substantially rigid state comprising, an electromechanical means for transforming electrical energy into mechanical vibrations, and fluid coupling means between said electromechanical means and said article for transferring said vibrations from said electromechanical means to said article which is rendered substantially rigid.

3. A tenderizer for a normally deformable article of food which has been transformed from its deformable state to a substantially rigid state comprising, an electromechanical means for transforming electrical energy into mechanical vibrations, and a resilient means operatively associated with said electromechanical means for applying a portion of said electromechanical means to a portion of said article for transferring said vibrations from said electromechanical means to said article which is rendered substantially rigid.

4. A tenderizer for a normally deformable article of food which has been transformed from its deformable state to a substantially rigid state comprising, an oscillator which produces alternating current power at a frequency of more than 1,000 cycles per second, an electromechanical means which produces mechanical vibrations conductively connected to said oscillator, and coupling means between said electromechanical means and said article of food while in its substantially rigid state for transferring said vibrations to said rigid article.

5. A tenderizer for a normally deformable article of food which has been transformed from its deformable state to a substantially rigid state comprising a support means for holding said article, a plurality of electromechanical means disposed above said support for transforming electrical energy into mechanical vibrations, each of said electromechanical means resiliently stressed against a portion of said article which is rendered substantially rigid.

6. A tenderizer for a normally deformable article of food which has been transformed from its deformable state to a substantially rigid state comprising, an electromechanical means for transforming electrical energy into mechanical vibrations, and resilient means operatively associated with said electromechanical means for applying a moving element of said electromechanical means to said article, and manual means for disengaging said moving element from said article which is rendered substantially rigid.

7. A tenderizer for a normally deformable article of food which has been transformed from its deformable state to a substantially rigid state comprising, a plurality of electromechanical means mounted on a revolving drum for transforming electrical energy into mechanical vibrations, each of said electromechanical means resiliently stressed against a portion of said article which is rendered substantially rigid, and switching means operatively associated with said electromechanical means for disconnecting said electrical energy whenever said electromechanical means are not stressed against a portion of said article.

8. A tenderizer for a normally deformable article of food which has been transformed from its deformable state to a substantially rigid state comprising, an electromechanical means for transforming electrical energy into mechanical vibrations and coupling means adapted to conform to the surface of said rigid body and associated with said electromechanical means for transferring said vibrations from said electromechanical means to said article which is rendered substantially rigid.

9. A tenderizer for a normally deformable article of food which has been transformed from its deformable state to a substantially rigid state comprising, a conveyor means which moves said article to an operating position, an oscillator which produces alternating current power at a frequency of more than 1,000 cycles per second, an electromechanical means which produces mechanical vibrations conductively connected to said oscillator and mounted above said operating position, and coupling means between said electromechanical means and said article applied at said operating position while in its substantially rigid state for transferring said vibrations to said rigid article.

10. A tenderizer for a normally deformable article of food which has been transformed from its deformable state to a substantially rigid state comprising, a conveyor means which moves said article to an operating position, a plurality of electromechanical means for transforming electrical energy into mechanical vibrations, said electromechanical means mounted above said operating position and arranged to make contact with said article while on said conveyor means, and coupling means between said electromechanical means and said article while in its substantially rigid state for transferring said vibrations to said rigid article.

11. A tenderizer as set forth in claim 9 wherein said plurality of electromechanical means are rotatably mounted above said operating position.

References Cited in the file of this patent

UNITED STATES PATENTS

| | | |
|---|---|---|
| 1,940,553 | Lieber | Dec. 19, 1933 |
| 2,462,554 | Robinson | Feb. 22, 1949 |